(12) United States Patent
Puigcorbé Punzano et al.

(10) Patent No.: US 8,511,044 B2
(45) Date of Patent: Aug. 20, 2013

(54) COMPOSITE CONNECTION FOR A WIND TURBINE TOWER STRUCTURE

(75) Inventors: Jordi Puigcorbé Punzano, Barcelona (ES); Albert Fisas Camañes, Barcelona (ES); Alberto González Del Egido, Barcelona (ES); Núria García Gómez, Barcelona (ES)

(73) Assignee: Alstom Wind, S.L.U., Barcelona (ES)

( * ) Notice: Subject to any disclaimer, the term of this patent is extended or adjusted under 35 U.S.C. 154(b) by 0 days.

(21) Appl. No.: 13/318,571

(22) PCT Filed: May 18, 2010

(86) PCT No.: PCT/EP2010/056760
§ 371 (c)(1),
(2), (4) Date: Nov. 2, 2011

(87) PCT Pub. No.: WO2010/133558
PCT Pub. Date: Nov. 25, 2010

(65) Prior Publication Data
US 2012/0159873 A1  Jun. 28, 2012

(30) Foreign Application Priority Data
May 21, 2009  (EP) .................................... 09160871

(51) Int. Cl.
*E04C 3/00* (2006.01)
(52) U.S. Cl.
USPC ...................... 52/845; 52/831; 52/836; 52/40

(58) Field of Classification Search
USPC ............... 52/40, 98, 831, 834, 835, 843, 848, 52/849; 403/335–335
See application file for complete search history.

(56) References Cited

U.S. PATENT DOCUMENTS

| | | |
|---|---|---|
| 904,841 A | 11/1908 | Clement |
| 3,793,794 A | 2/1974 | Archer |
| 3,793,797 A | 2/1974 | Archer |
| 6,157,088 A | 12/2000 | Bendix |
| 6,467,233 B1 | 10/2002 | Maliszewski |
| 7,464,512 B1 | 12/2008 | Perina |
| 7,802,412 B2 * | 9/2010 | Jensen ........................ 52/651.07 |
| 2004/0098935 A1 | 5/2004 | Henderson |
| 2005/0072067 A1 | 4/2005 | Wobben |
| 2006/0156681 A1 | 7/2006 | Gomez |
| 2007/0006541 A1 | 1/2007 | Seidel |

FOREIGN PATENT DOCUMENTS

| | | |
|---|---|---|
| CH | 251994 | 6/1949 |
| CN | 1580548 | 2/2005 |
| DE | 3900432 | 7/1990 |

(Continued)

*Primary Examiner* — Brian Glessner
*Assistant Examiner* — Adam Barlow
(74) *Attorney, Agent, or Firm* — Squire Sanders (US) LLP

(57) ABSTRACT

A tower section for a wind turbine tower structure comprises at least two shell segments defining, in an assembled condition, a substantially hollow structure, and including first connecting means for mutually joining two adjacent shell segments along a joint, which comprise a column of concrete arranged overlapping at least part of the joint between adjacent shell segments. A method for building a tower section for a wind turbine tower structure and a wind turbine comprising a nacelle having rotatable blades and a vertical tower made of at least one of such tower sections are further provided.

16 Claims, 3 Drawing Sheets

(56) References Cited

FOREIGN PATENT DOCUMENTS

| | | |
|---|---|---|
| DE | 19802210 | 7/1999 |
| DE | 19832921 | 2/2000 |
| DE | 19832921 A1 * | 2/2000 |
| DE | 20013774 | 2/2002 |
| DE | 102005014025 | 9/2003 |
| DE | 10230273 | 2/2004 |
| EP | 0960986 | 12/1999 |
| EP | 1624137 | 2/2006 |
| EP | 1624137 A1 * | 2/2006 |
| EP | 1876316 | 12/2009 |
| FR | 802324 | 9/1936 |
| FR | 2586737 | 3/1987 |
| GB | 611907 | 11/1948 |
| JP | 9195584 | 2/1999 |
| JP | 2003147864 | 5/2003 |
| JP | 2005220715 | 8/2005 |
| JP | 2007321710 | 12/2007 |
| WO | 0238891 | 5/2002 |
| WO | 03069099 | 5/2003 |
| WO | 03048570 | 6/2003 |
| WO | 2004031578 | 4/2004 |
| WO | 2004083633 | 9/2004 |
| WO | 2005005752 | 1/2005 |
| WO | 2007095940 | 8/2007 |
| WO | 2005015013 | 2/2008 |
| WO | 2008031912 | 3/2008 |
| WO | 2008087181 | 7/2008 |

* cited by examiner

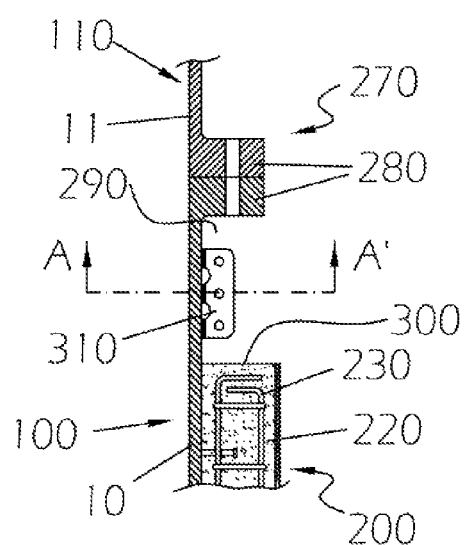
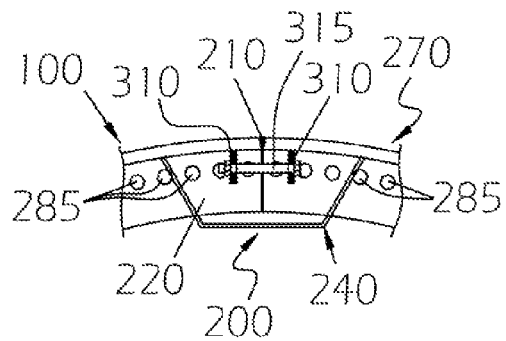
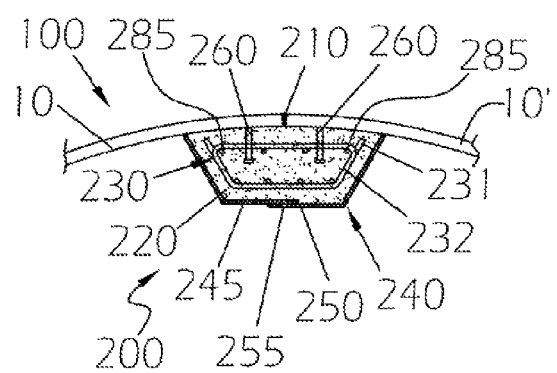
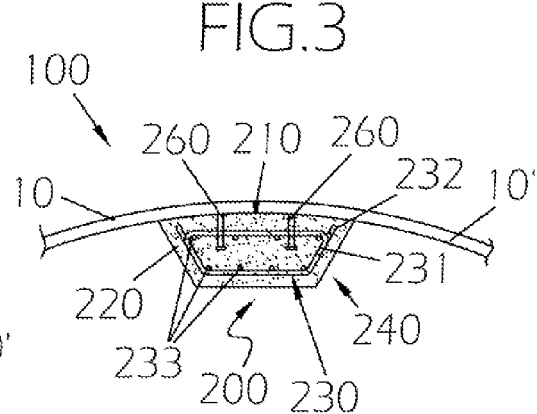
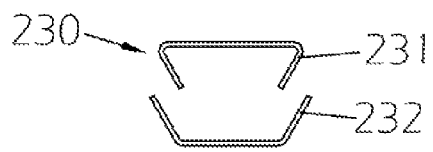
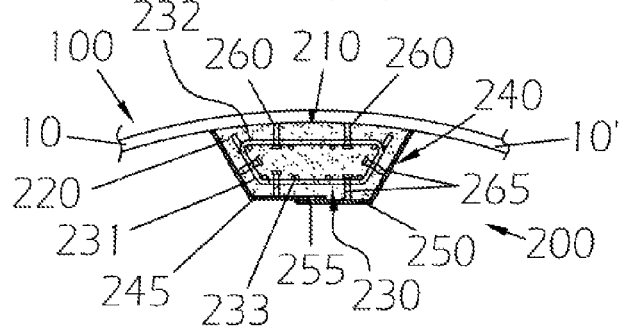

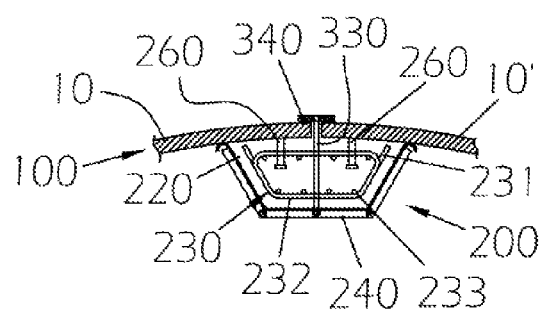
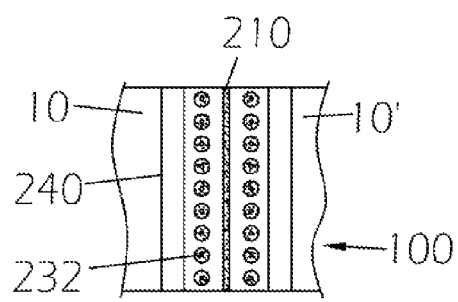
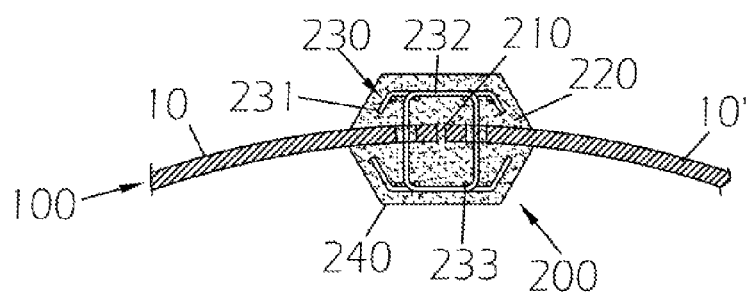
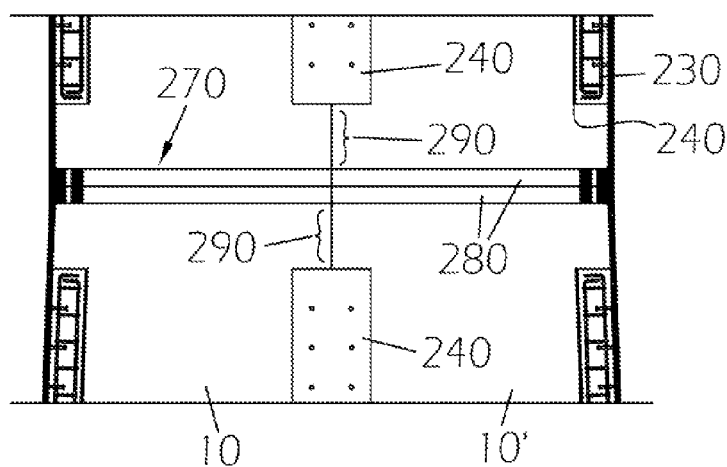

COMPOSITE CONNECTION FOR A WIND TURBINE TOWER STRUCTURE

CROSS-REFERENCE TO RELATED APPLICATIONS

This application claims priority to PCT Application No. PCT/EP2010/056760 entitled "COMPOSITE CONNECTION FOR A WIND TURBINE TOWER STRUCTURE", filed May 18, 2010, which claims priority to European Application No. 09160871.1 entitled "COMPOSITE CONNECTION FOR A WIND TURBINE TOWER STRUCTURE", filed May 21, 2009, the disclosure of each is hereby incorporated by reference as if set forth in its entirety herein.

STATEMENT REGARDING FEDERALLY SPONSORED RESEARCH OR DEVELOPMENT

Not applicable.

TECHNICAL FIELD

The present invention relates to a tower section for a wind turbine tower structure. The invention is particularly useful for, but not limited to, large wind turbine towers and, in general, for tubular structures which have to withstand high loads.

A tower section according to the invention comprises two or more shell segments. In an assembled condition, the shell segments define a substantially hollow structure which will be referred hereinafter to as tower section. A tower section according to the invention includes first connecting means for mutually joining two adjacent shell segments along a joint.

The invention further relates to a method for building such a tower section for a wind turbine tower structure and to a wind turbine comprising a nacelle having rotatable blades and a vertical tower that comprises at least one of said tower sections.

BACKGROUND OF THE INVENTION

Costs involved in a wind turbine tower structure are generally of the order of about 20-25 percent of the total costs of the wind turbine, depending on tower height and power of the wind turbine. It is therefore quite important for the final wind turbine costs to build towers as optimally as possible. Development of increasingly higher wind turbines (above 80 m) entails high loads in the structural parts to be taken into consideration. High bending moments and loads caused by wind thrust requires tower sections diameter and wall thickness to be increased. In practice, however, tower dimensions are limited (up to 4.5 m in diameter) due, for example, to transport requirements. Such a limitation results in a non-linear increase of tower costs as the wall thickness is increased and hence the tower design obtained is not optimal. Furthermore, other limitations are involved in tower designs such as tower wall thickness due to manufacturing processes.

The use of large diameter wind turbine towers can be achieved through the use of towers formed with shell segments and connecting means for joining the segments to each other. Shell segments, when connected, define a closed tower section and several tower sections connected to each other (arranged one above the other) define the wind turbine tower structure.

One example of such a construction is disclosed, for example, in WO2007095940 which relates to a wind turbine tower comprising two or more adjacent shell segments connected to one another through plates and bolts.

WO2004083633 provides a windmill steel tower comprising a number of tower sections each comprising two or more elongated shell segments, which combine into a complete tower section by means of vertical flanges tightened together by bolts.

The main disadvantages with these solutions relate to high manufacturing, installation and maintenance costs due to the large number of pre-stressed bolts required at vertical flange connections.

BRIEF SUMMARY OF THE INVENTION

The present invention provides a tower section which construction makes it possible to build high wind turbine tower structures withstanding higher loads acting on the wind turbine tower. As used herein, a tower section denotes each tubular level of a tower structure (e.g. a wind turbine structure). A tower structure as used herein therefore denotes several tower sections arranged vertically one above the other, although in a limit embodiment, a tower structure could comprise only one tower section. As used herein, shell segment denotes unitary plates (e.g. curved metal plates) defining, in an assembled condition, a substantially hollow structure, i.e. a tower section.

The tower section of the invention comprises at least two shell segments that can be made of metal, such as steel. The tower section of the invention may be cylindrical or frusto-conical in shape, in the latter case being arranged such that diameter increases towards the base in order to enhance strength and to save materials.

The tower section according to the invention is provided with first connecting means for mutually joining two adjacent shell segments along a joint. Said first connecting means may comprise a column of concrete arranged overlapping at least part of the joint between adjacent shell segments in the tower section.

This column of concrete of the first connecting means is arranged substantially vertical in the assembled condition of the tower section. The column of concrete may be made of steel reinforced concrete and it may be arranged either in the interior of the hollow structure or outside the hollow structure, or even both in the interior of the hollow structure of and outside the hollow structure, as required.

The first connecting means of the shell segments in a tower section further comprise a formwork shaped to define an inner volume to be filled with concrete (to form the column joining the shell segments). The formwork may comprise, for example, a first plate associated with a first shell segment and a second plate associated with a second, adjacent shell segment. In the assembled condition, the first and second plates of adjacent shell segments respectively define an inner volume suitable to be filled with concrete. Of course other formwork constructions could be possible, such as, for example, one comprising a single plate associated with one shell segment with said single plate being shaped to define an inner volume suitable to be filled with concrete.

At least one of the shell segments may be provided with shear connectors (e.g. welded to the shell segments) protruding therefrom and embedded in the column of concrete in the assembled condition. In this way, within the closed space defined by the formwork, shear connectors along with the corresponding steel reinforcement are embedded within concrete when in said assembled condition. Shear connectors and steel reinforcement serve the purpose of ensuring shear strength between the shell segments.

In one embodiment, the formwork may be integral with at least one of the shell segments (lost formwork). In other embodiment, the formwork may be removable from at least one of the shell segments. In this case, a reduction of costs can be achieved since the formwork may be reused for different wind turbine towers. Furthermore imperfections in the column of concrete can be repaired after formwork removal.

The tower section of the invention is further provided with second connecting means for mutually joining two adjacent tower sections, one above the other, for forming the wind turbine tower. This second connecting means may comprise a flange adapted for receiving and joining an adjacent tower section. In the assembled condition, the flange is arranged adjacent a peripheral edge of the shell segments.

The flange may be circular and it may be continuous or discontinuous. A gap portion may be defined between the first and the second connecting means, that is, between one end of the column of concrete and the flange. This gap portion serves the purpose of allowing fastening means to be fitted (such as bolts, screws and the like). In other embodiments no gap portion exists and one end of the column of concrete may be adjacent the flange such that the length of the column may substantially correspond to height of the tower shell segment. In the embodiment in which the flange is discontinuous, flange discontinuities could be, for example, in the form of outwardly protruding portions formed in correspondence to the concrete column, that is, corresponding to the portion where said end of the column is adjacent the flange or it may be by providing a flange formed of several flange segments arranged such that a clearance is formed in the area near one end of the column of concrete.

The invention further provides a method for building a tower section for a wind turbine tower structure. The method comprises the steps of providing at least two of such shell segments, placing the shell segments such that a substantially hollow structure is defined and forming a column of concrete arranged overlapping at least part of a joint between adjacent shell segments. Column formation may be carried out, for example, by pouring concrete into the closed volume defined by the formwork and allowing concrete to set for structurally fixing the tower shell segments. Once the tower section is formed (by joining adjacent shell segments) a further step may be performed of mutually joining two adjacent tower sections one above the other through the use of second connecting means, for example through an arc flat bolted flange. The provision of the second connecting means allow several tower sections to be joined one above the other and flange stiffness in the gap portion to be increased.

The invention further relates to a wind turbine comprising a nacelle having rotatable blades and a vertical tower that comprises one or more of such tower sections.

The main advantages of the invention are that there is no need for the pretension of a large number of bolts to be regularly controlled throughout the tower structure service live. This results in lower costs involved. In addition, maintenance costs are further reduced since no access is needed along the length of the joint for maintenance operations as occurs in the prior art tower structures formed of several shell segments (which used vertical flanges and long vertical welded lines to connect flanges to shell segments).

Additional advantages of the invention are that the use of columns of concrete allows dimensional tolerances to be best accommodated as well as achieving a reliable joint sealing since the column of concrete prevents joint sealing material from being degraded.

BRIEF DESCRIPTION OF THE SEVERAL VIEWS OF THE DRAWING

A particular embodiment of a tower section for a wind turbine tower structure according to the present invention will be described in the following, only by way of non-limiting example, with reference to the appended drawings, in which:

FIG. 1 is a fragmentary sectional view of two shell segments corresponding to different tower sections, one above the other, for forming a tower;

FIG. 2 is a fragmentary top plan view taken along line AA' in FIG. 1 of two adjacent shell segments in the same tower section in which the first connecting means are shown;

FIGS. 3-5 are fragmentary top plan views of two adjacent shell segments in the same tower section in which one embodiment of the first connecting means including lost formwork is shown;

FIG. 6 is a top plan view of one example of a reinforcement structure to be used with the formwork of the first connecting means;

FIG. 11 is a fragmentary top plan view of two adjacent shell segments in the same tower section in which another embodiment of the first connecting means is shown;

FIG. 12 an elevational view of the inside of a tower section showing the first connecting means;

FIG. 13 is a top plan view of two adjacent shell segments in the same tower section in which yet a further embodiment of the first connecting means is shown;

FIG. 14 is an elevational view of a tower section.

DETAILED DESCRIPTION OF THE INVENTION

Figure 7:
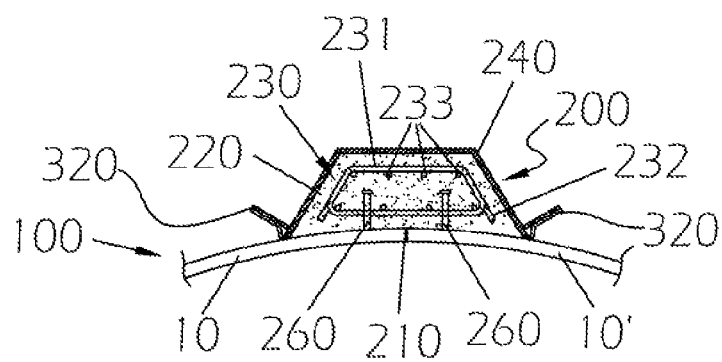
FIG. 7 is a fragmentary top plan view of two adjacent shell segments in the same tower section in which one embodiment of the first connecting means with removable formwork arranged outside the tower section is shown.

A tower structure (a substantially hollow structure) comprises a plurality of tower sections 100, 110. Two of them are generally depicted in FIG. 1 for purposes of clarity. In use, the tower sections 100, 110 are arranged on one another for forming a wind turbine tower structure. A tower section 100 is formed with a plurality of shell segments 10, 10'. Likewise, the contiguous tower section 110 fixed to said other tower section 100 is formed with corresponding shell segments, only one of which is shown and designed at 11. Each shell segment 10, 10', 11 consists of a unitary curved plate made of metal such as steel.

FIG. 1, for example, shows part of two shell segments 10, 11 of different tower sections 100, 110 with one section arranged above the other and defining a cylindrical or frustoconical tower structure depending on the geometry of the shell segments 10, 10', 11 and therefore that of tower section formed.

First connecting means 200 are provided for mutually joining two adjacent shell segments 10, 10'; 11 along a vertical joint 210. It will be understood that shell segments 10 and 10' are adjacent in one tower section 100 while shell segments 11 are adjacent in another, different tower section 110.

The first connecting means 200 comprise a column of concrete 220 that in use is arranged overlapping at least part of said joint 210 between adjacent shell segments 10, 10'; 11 in respective tower sections 100, 110. The column of concrete 220 is arranged substantially vertical in the assembled condition of the tower section 100, 110. The column of concrete 220 may be a column of high strength steel reinforced concrete. For this purpose, there is provided a reinforcement structure 230 formed of several reinforcement members 231, 232, 233. The main reinforcement members 231, 232 are shown in FIG. 6. Additional vertical rods 233 are part of the reinforcement structure 230 in said first connecting means 200.

As shown in FIG. 2 of the drawings, a plate and bolt arrangement 310, 315 may be also used for cooperating with the first connecting means 200 for increasing strength. As it will be fully explained below, said arrangement 310, 315 may be fitted in a gap portion 290 in the tower sections 100, 110.

Several embodiments of the first connecting means 200 may be provided. For example, as shown in embodiment in FIGS. 3-5 and 8-11 of the drawings, the first connecting means 200 are fitted inside the tower structure. In these drawings, it can be seen how the column of concrete 220 is arranged in the interior of the tower section 100, 110. As a further example, in the embodiment in FIG. 7 of the drawings, for example, the first connecting means 200 are fitted outside the tower structure, that is, with the column of concrete 220 arranged in the exterior of the tower section 100, 110. Yet in a further embodiment of the invention shown in FIG. 13, the first connecting means 200, and therefore the column of concrete 220, is arranged both inside the hollow structure of and outside the hollow structure.

The column of concrete 220 is formed by means of a formwork 240. Formwork 240 is shaped to define an inner volume to be filled with concrete (to form the column 220 joining the shell segments 10, 10'; 11).

In the embodiment shown in FIGS. 2 and 3, the formwork 240 is integral with the respective tower sections 110, 110 (lost formwork). In the embodiment shown in FIGS. 4 and 5, the formwork 240 comprises a first plate 245 associated with a first shell segment 10 and second plate 250 associated with a second, adjacent shell segment 10'. The plates 245, 250 of the formwork 240 are secured by a bolt fitted in a common hole 255 of both plates 245, 250 of the formwork 240 as shown in FIGS. 4 and 5.

Figure 8:
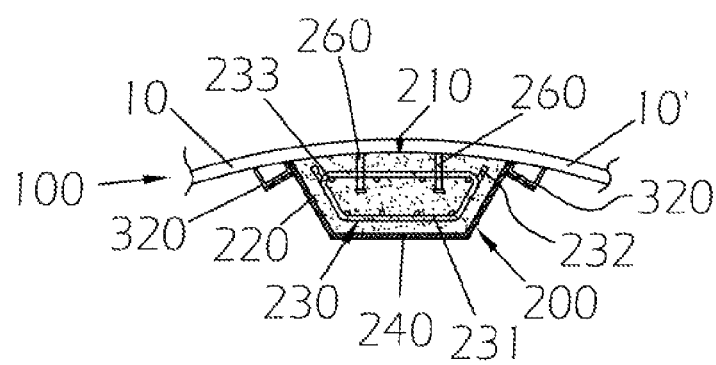
FIG. 8 is a fragmentary top plan view of two adjacent shell segments in the same tower section in which one embodiment of the first connecting means with removable formwork arranged inside the tower section is shown.
Figure 9:
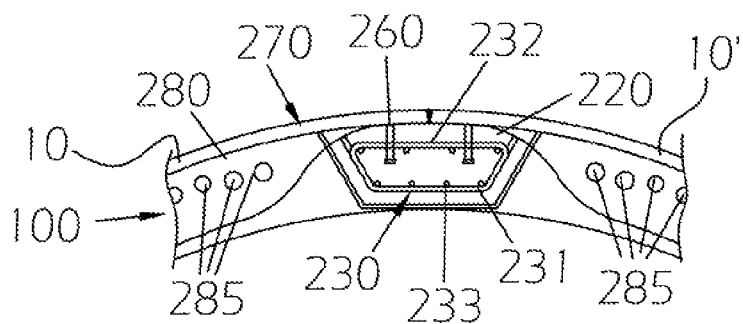
FIGS. 9 and 10 are fragmentary top plan views of a tower section showing respective embodiments of the second connecting means.
Figure 10:
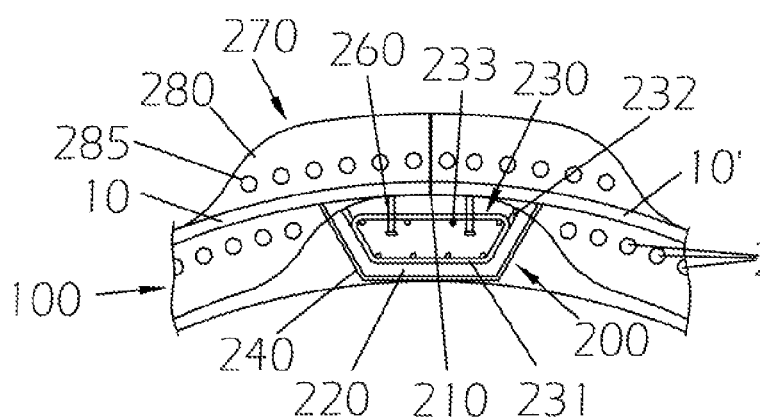

More particularly, the plates 245, 250 of the formwork 240 are bent and, in use, are attached (e.g. by welding) through one edge thereof to the respective shell segments 10, 10' while the other edge of one plate 250 substantially overlaps the corresponding edge of the other plate 245 (where said common hole 255 is formed). Therefore an inner volume is formed suitable to be filled with concrete in order to form the column 220. In the embodiments shown in FIGS. 7 and 8, the formwork 240 can be removed from at least one of the shell segments 10, 10'. This is carried out through the use of fixing plates 320 that are formed in the formwork 240 as shown in FIGS. 7 and 8 of the drawings. Alternatively, it may be carried out as shown in FIG. 11 through the use of a tie rod and plate arrangement 330, 340. This arrangement shown in FIG. 11 comprises a tie rod 330 one end of which is attached to a portion of the formwork 240, and the opposite end of which being attached to a longitudinal plate 340 provided outside the tower section 100 in a portion corresponding to the vertical joint 210. This embodiment shown in FIG. 11 avoids the use of fixing plates 320 and prevents the formwork 240 from being bent inwardly due when filled with concrete.

Shear connectors 260 are provided welded to the shell segments 10, 10' protruding inwardly therefrom. As shown in FIG. 5, additional shear connectors 265 may be also provided welded to the plates 245, 250 of the formwork 240 and protruding inwardly therefrom.

In the assembled condition, the reinforcement structure 230 and the shear connectors 260, 265 are all embedded within the column of concrete 220 for ensuring shear strength between the shell segments 10, 10'; 11, 11'.

For attaching the formed tower sections 100, 110 of the wind turbine tower structure one above the other second connecting means 270 are provided. The second connecting means 270, which may be seen in FIGS. 1, 2, 9 and 10 comprise a flange 280 adapted for mutually joining two adjacent tower sections 100, 110, one above the other as partially shown in FIG. 1. The flange 280 of each tower section 100, 110 is provided with a series of holes 285 for receiving corresponding fastening bolts. In the assembled condition, the flange 280 is arranged adjacent a peripheral edge of the shell segments (see FIGS. 9 and 10).

A gap portion 290 is defined between the first and the second connecting means 200, 270, that is, between one end 300 of the column of concrete 220 and the flange 280 as shown in FIG. 14. This gap portion 290 serves the purpose of allowing the above mentioned plate and bolt arrangement 310, 315 to be fitted for cooperating with the first connecting means 200 as shown in FIGS. 1 and 2.

The flange 280 may be circular in shape. In the embodiment shown in FIG. 10, the flange 280 is continuous while in the embodiment shown in FIG. 9 the flange 280 is discontinuous.

Flange discontinuities are in the form of outwardly protruding portions formed in correspondence to the concrete column (see FIG. 10), that is, corresponding to the portion where said end 300 of the column 220 is adjacent the flange 280.

The method for building a tower section 100, 110 for a wind turbine tower structure is carried out as follows: two or more shell segments 10, 10', 11, 11' are arranged such that a substantially hollow structure is defined. Then a column of concrete 220 is formed by pouring concrete within a formwork structure 240 fitted between adjacent shell segments 10, 10'; 11, 11' and allowing concrete to set for structurally fixing the tower shell segments such that the resulting column of concrete 220 overlaps at least part of the joint 210 between the shell segments 10, 10', 11, 11'. The formwork structure 240 may be then removed or left in place (lost formwork) in the event that the formwork 240 is formed integrally with at least one of the shell segments 10, 10'.

Once a tower section 100 is formed as disclosed, said tower section 100 is connected to another adjacent tower section 110. This is carried out by the second connecting means 270 (the arc flat bolted flange 280 shown in FIGS. 9 and 10) of the respective tower sections 100, 110.

Having thus described the invention, what is claimed is:

1. A tower section for a wind turbine tower structure comprising:
   at least two shell segments defining, in an assembled condition, a substantially hollow structure, and including a first connecting means for mutually joining two adjacent shell segments along a joint, wherein
   the first connecting means comprise a column of concrete arranged overlapping at least part of the joint between the adjacent shell segments,
   the first connecting means further comprising a formwork shaped to define an inner volume to be filled with concrete to form the column of concrete joining the adjacent shell segments, the formwork comprises a first plate associated with a first shell segment and a second plate associated with a second adjacent shell segment, the first and second plates of the formwork are secured by a bolt fitted in a common hole of both plates, and the first and second plates are bent and the first plate is attached through one edge thereof to the first respective shell segment and the second plate is attached through one edge thereof to the second respective shell segment, while another edge of the first plate substantially overlaps the corresponding other edge of the second plate.

2. The tower section as claimed in claim 1, wherein the column of concrete is arranged in the interior of the hollow structure.

3. The tower section as claimed in claim 1, wherein the column of concrete is arranged outside the hollow structure.

4. The tower section as claimed in claim 1, wherein the column of concrete is arranged both in the interior of the hollow structure and outside the hollow structure.

5. The tower section as claimed in claim 1, wherein at least one of the shell segments is provided with shear connectors protruding therefrom and embedded in the column of concrete in the assembled condition.

6. The tower section as claimed in claim 1, wherein the formwork is integral with at least one of the shell segments.

7. The tower section as claimed in claim 1, wherein the formwork is removable from at least one of the shell segments.

8. The tower section as claimed in claim 1, wherein the column of concrete of the first connecting means is made of steel reinforced concrete.

9. The tower section as claimed in claim 1, wherein it further comprises a second connecting means for mutually joining two adjacent tower sections one above the other.

10. The tower section as claimed in claim 9, wherein the second connecting means comprise a flange adapted for receiving and joining an adjacent tower section, the flange being arranged, in the assembled condition, adjacent a peripheral edge of the shell segments.

11. The tower section as claimed in claim 10, wherein the flange is discontinuous.

12. The tower section as claimed in claim 10, wherein the flange has outwardly protruding portions formed in correspondence to the column of concrete.

13. The tower section as claimed in claim 1, wherein the shell segments are made of metal.

14. A method for building a tower section for a wind turbine tower structure comprising the steps of:

providing at least two shell segments, placing the shell segments in an assembled condition such that a substantially hollow structure is defined for forming a column of concrete arranged overlapping at least part of a joint between adjacent shell segments, and providing a formwork shaped to define an inner volume to be filled with concrete so as to form with the concrete a vertical connecting member joining the adjacent shell segments, wherein the formwork comprises a first plate associated with a first shell segment and a second plate associated with a second adjacent shell segment, the first and second plates of the formwork are secured by a bolt fitted in a common hole of both plates, and the first and second plates are bent and the first plate is attached through one edge thereof to the first respective shell segment and the second plate is attached through one edge thereof to the second respective shell segment, while another edge of the first plate substantially overlaps the corresponding other edge of the second plate.

15. The method as claimed in claim 14, wherein it further comprises the step of mutually joining two adjacent tower sections one above the other.

16. A wind turbine comprising a nacelle having rotatable blades and a vertical tower, said tower comprising at least one tower section, the tower section comprising at least two shell segments defining, in an assembled condition, a substantially hollow structure, and including a first connecting means for mutually joining two adjacent shell segments along a joint, wherein the first connecting means comprise a column of concrete arranged overlapping at least part of the joint between the adjacent shell segments, the first connecting means further comprising a formwork shaped to define an inner volume to be filled with concrete to form the column of concrete joining the adjacent shell segments, the formwork comprises a first plate associated with a first shell segment and a second plate associated with a second adjacent shell segment, the first and second plates of the formwork are secured by a bolt fitted in a common hole of both plates, and the first and second plates are bent and the first plate is attached through one edge thereof to the first respective shell segment and the second plate is attached through one edge thereof to the second respective shell segment, while another edge of the first plate substantially overlaps the corresponding other edge of the second plate.

* * * * *